United States Patent

Miller et al.

[11] 4,012,626
[45] Mar. 15, 1977

[54] VERTICAL NAVIGATION CONTROL SYSTEM

[75] Inventors: Ronald J. Miller, Glendale; Paul A. Rauschelbach, Phoenix, both of Ariz.

[73] Assignee: Sperry Rand Corporation, New York, N.Y.

[22] Filed: Apr. 18, 1975

[21] Appl. No.: 569,340

[52] U.S. Cl. .......................... 235/150.26; 244/180; 244/189
[51] Int. Cl.² .................. G01C 21/20; B64C 19/00
[58] Field of Search .................. 235/150.22, 150.26, 235/150.27; 244/77 D, 77 A, 77 B, 180, 182, 186, 187, 189; 343/112 A, 112 R; 73/178 T, 178 R; 340/27 NA

[56] References Cited

UNITED STATES PATENTS

| | | | |
|---|---|---|---|
| 3,524,612 | 8/1970 | Ainsworth et al. | 244/77 D |
| 3,545,703 | 12/1970 | Doniger et al. | 244/77 D |
| 3,644,722 | 2/1972 | Hobbs et al. | 244/77 D |
| 3,666,929 | 5/1972 | Menn | 235/150.22 |
| 3,705,306 | 12/1972 | Lydon et al. | 343/112 A |
| 3,715,718 | 2/1973 | Astengo | 343/112 A |
| 3,740,004 | 6/1973 | Doniger et al. | 235/150.22 |
| 3,743,221 | 7/1973 | Lykken et al. | 235/150.22 |
| 3,847,328 | 11/1974 | Simpson et al. | 235/150.22 |

*Primary Examiner*—Malcolm A. Morrison
*Assistant Examiner*—Errol A. Krass
*Attorney, Agent, or Firm*—Howard P. Terry

[57] ABSTRACT

Apparatus for use with an area navigation system wherein the craft is maintained on a predetermined vertical flight path. Specifically, a pitch command signal for controlling the vertical flight of the craft, which is substantially free of discontinuities, is produced by summing a signal indicative of the vertical displacement of the craft from the flight path with a damping signal representative of the vertical deviation rate of the craft from the vertical velocity required to maintain the craft on the flight path. Additionally, the vertical displacement signal is limited to a maximum amplitude to compensate for discontinuities therein, with respect to passage of the craft through the vicinity of a VOR/TAC station.

7 Claims, 4 Drawing Figures

VERTICAL NAVIGATION CONTROL SYSTEM

BACKGROUND OF THE INVENTION

1. Field of the Invention

The invention relates generally to area navigation systems and more particularly to apparatus for controlling the vertical flight path of an airborne craft relative to preselected waypoint.

2. Description of the Prior Art

Automatic vertical navigation (VNAV) systems are relatively new to the art of area navigation systems. Nevertheless, problem areas in VNAV systems are analogous in some respects to some of the problem areas in lateral navigation systems (RNAV) and must be corrected or compensated for in order to provide a smooth flight on the vertical flight path. More specifically, such problems arise in attempting to provide a suitable and effective damping signal for the control system and in compensating for inherent discontinuities in the control data while the craft is in the vicinity of a VOR/TAC station.

For example, the vertical displacement signal (the signal representing the displacement or deviation of the craft from the computed vertical flight path) is typically subject to irregularities therein due to the method of computation. For example, a computerized system utilizing digital computation techniques will generally produce a vertical displacement signal with a stair/step or granular waveform in addition to the noise transients usually present rendering the signal unsuitable for deriving damping data therefrom.

Also, there may be an inherent discontinuity in vertical displacement signal which dramatically manifests itself when the craft passes over or near a VOR/TAC station. Specifically, the altitude of the craft is typically computed on the basis of the difference in barometric pressure between i) the craft and sea level for craft altitudes in excess of 18,000 feet; ii) the craft and the elevation of the VOR/TAC station for altitudes less than 18,000 feet. Because the reported station barometric pressure may be issued from a location some distance from the VOR/TAC station and because the pilot may err in setting the barometric pressure on the altimeter, an error of up to 2,000 feet may exist. As the craft traverses the vicinity of the VOR/TAC station (commonly referred to as passing through the "zone of confusion"), the slant range of the craft, which is accurately measured by a radio signal, will equal the altitude of the craft above the station. At this point, any error in the barometric altitude will become evident and will accordingly manifest itself in the vertical displacement signal. The system recognizes this problem and takes appropriate measures to prevent the craft from overreacting to this error.

SUMMARY OF THE INVENTION

The present invention comprises a vertical navigation control system, preferably for use in a area navigation system, which incorporates a novel system for maintaining the craft on the vertical flight path. Primarily, the pitch command signal for controlling the vertical flight of the craft is determined from a signal representing the vertical displacement of the craft from a preselected or predetermined flight path and is normally directly available from a navigation computer. However, as earlier noted, this signal is unsuitable for providing a system damping term. Accordingly, the system generates a damping signal, independently from the vertical displacement signal which is combined therewith to complete the pitch command signal. More particularly, a reference vertical velocity signal, which represents the vertical velocity necessary to maintain the flight path at a given air speed, is generated by multiplying a signal representing the true air speed of the craft with a signal indicative of the angle of the predetermined flight path. This signal is then compared with a signal representing the acutal vertical velocity of the craft. The difference therebetween, which is utilized as the damping signal for the system, represents the vertical deviation rate of the craft and is substantially free from discontinuities which would otherwise be present in a damping signal derived from the vertical displacement signal. Additionally, a limiting circuit is also incorporated to limit the maximum amplitude of the vertical displacement signal to compensate for substantial discontinuities which may develop in the vertical displacement signal, while the craft is in the vicinity of a VOR/TAC station enroute to a preselected waypoint.

The system further includes apparatus incorporated into the system to provide for a smooth transition from the original horizontal flight path onto the inclined vertical flight path and from the inclined vertical flight path onto the new horizontal flight path.

DESCRIPTION OF THE PREFERRED EMBODIMENT

Figure 1:
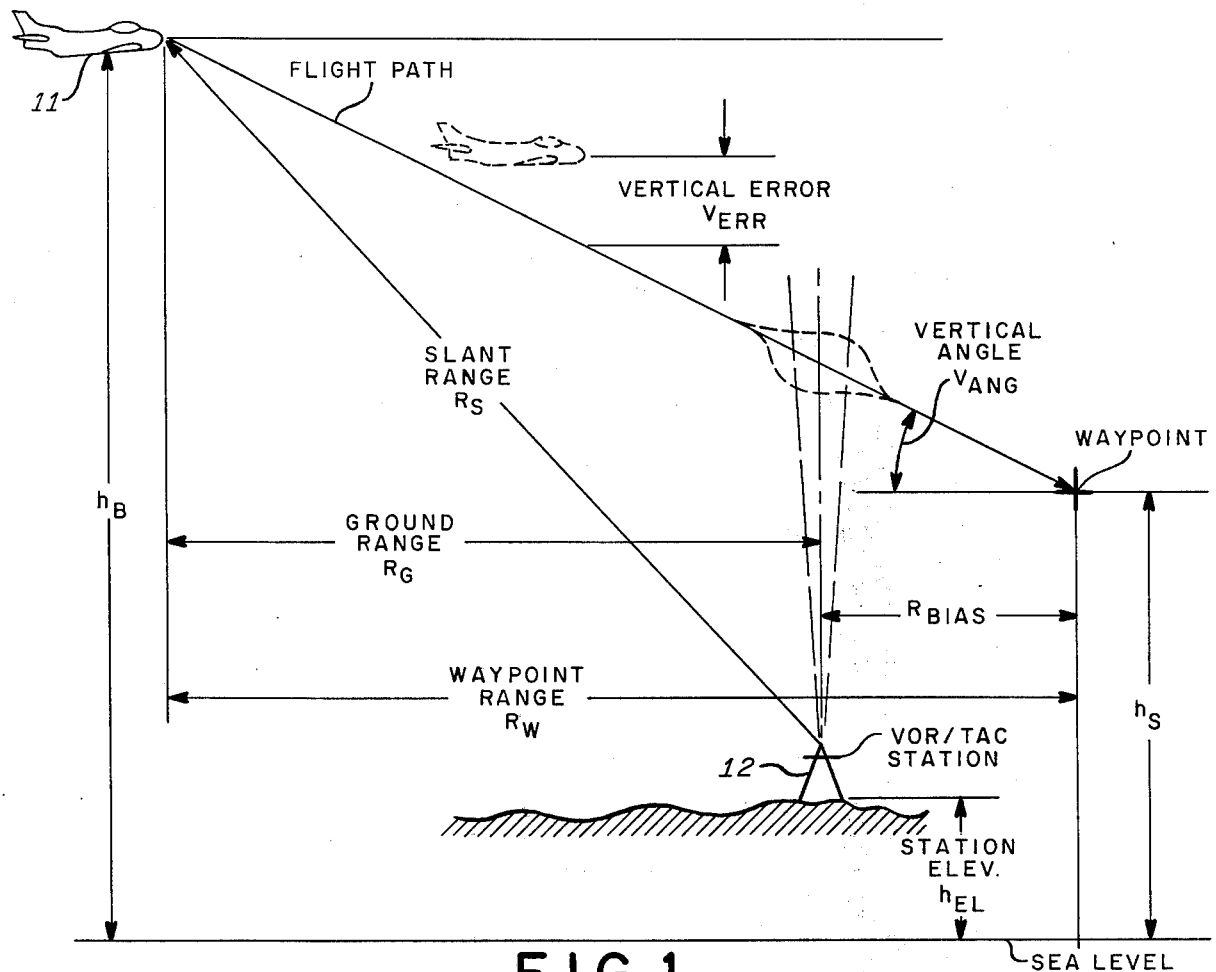
FIG. 1 is a pictorial illustration of a typical vertical flight path navigation problem useful in defining some of the various parameters which are utilized by the system to produce the craft pitch command signal.

FIG. 1 depicts a typical problem in the vertical navigation mode of an area navigation system. An aircraft 11 is illustrated as flying at a barometric altitude (from sea level) of $h_B$. The pilot determines or the area navigation flight plan automatically programs the craft to a new altitude $h_S$ at a selected or predetermined location, hereinafter referred to as the waypoint, depicted as horizontally offset or displaced by a distance $R_{BIAS}$ from a VOR/TAC station and wherein $R_{BIAS}$ is similarly determined or programmed. The angle of the flight path $V_{ANG}$ or $\gamma$ may be selected by the pilot or computed by a vertical navigation computer. The vertical navigation computer, to be described more particularly hereinafter, computes a plurality of parameters utilizing conventional analog or digital techniques according to the equations enumerated below. In effect, the navigation computer, computes a vertical flight path similar to the glide slope path of an ILS (Instrument Landing System) using available data representing the range from a VOR/TAC station, aircraft altitude, desired altitude, flight path angle, bias offset and the way point.

The ground range $R_G$ (the horizontal distance between the craft 11 and the VOR/TAC station 12) is computed according to the following conventional equation:

$$R_G = [R_S^2 - (h_B - h_{EL})^2]^{1/2} \qquad (1)$$

where the slant range $R_S$ is equal to the DME (Distance Measuring Equipment) distance between a VOR/TAC station 12 and the aircraft 11; the barometric altitude $h_B$ is equal to the altitude between the aircraft 11 and sea level as provided by a conventional air data computer in the aircraft; and $h_{EL}$ is the altitude of the VOR/TAC station relative to sea level.

The way point range $R_W$, the horizontal distance between the craft 11 and the way point, is thereafter determined by the equation:

$$R_W = R_G + R_{BIAS} \qquad (2)$$

where $R_{BIAS}$ has been determined by the pilot or programmed into the flight plan. If the angle of the flight path $V_{ANG}$ or $\gamma$ is selected by the pilot, it is, of course, directly available. If not, it will be computed by the vertical navigation computer according to the following equation:

$$\gamma = \text{ARC TAN}\left(\frac{h_B - h_S}{RW}\right) \qquad (3)$$

where the altitude $h_S$ is selected by the pilot or provided by the flight plan program and equals the altitude of the way point and sea level.

Lastly, the flight path angle error or the vertical displacement error $V_{ERR}$ from the flight path is computed according to the equation:

$$V_{ERR} = (h_B - h_S) - R_W (\tan \gamma) \qquad (4)$$

where $\gamma$ is selected by the pilot or determined by the vertical navigation computer according to equation (3).

The vertical displacement error $V_{ERR}$, as earlier noted, is subject to discontinuities and granularity therein due to the method of computation. Specifically, if computed digitally, for example, a stair/step signal wave form is characteristic in addition to noise transients. Moreover, substantial discontinuities may occur as the aircraft passes over or near the VOR/TAC station 12. The present invention comprises apparatus for deriving a system damping signal free of any discontinuities such as those associated with station passage which are present in the displacement error signal $V_{ERR}$, and which is referenced to the selected or computed flight path.

Figure 2:
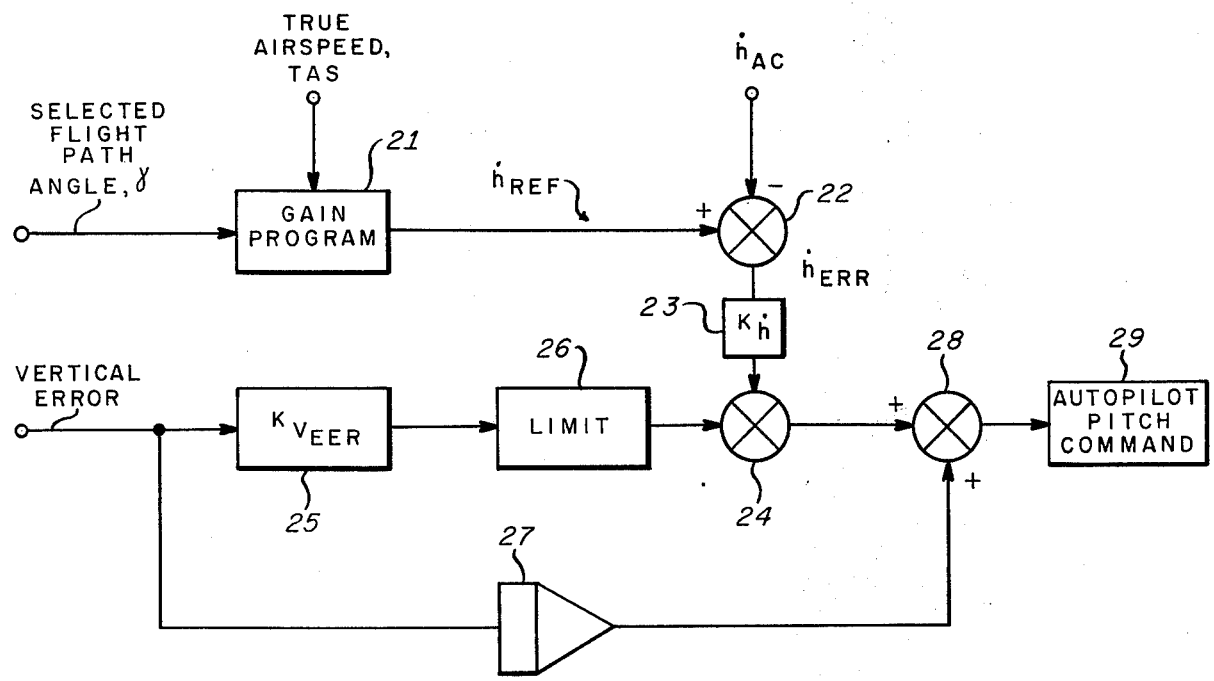
FIG. 2 is a schematic-block diagram illustrating the basic elements of the present invention for generating craft pitch command signal.

FIG. 2 illustrates the basic combination of the present invention. The signal $V_{ANG}$ representing the angle $\gamma$ of the flight path as selected by the pilot or computed by the vertical navigation computer is coupled to a gain program circuit 21 in which the angle $V_{ANG}$ is multiplied by a signal representing the true air speed of the craft (TAS) and in which the gain is varied according to the TAS. The product derived therefrom, the reference vertical velocity signal $\dot{h}_{REF}$ is summed with a signal $\dot{h}_{AC}$ representing the actual vertical velocity of the craft in a summing circuit 22 which generates a vertical rate error signal $\dot{h}_{ERR}$ representing the difference therebetween. The $\dot{h}_{ERR}$ signal is thereafter coupled to a variable gain amplifier 23, the output of which is coupled to summing circuit 24.

A signal $V_{ERR}$ representing the vertical displacement of the craft from the selected or computed flight path is coupled to a gain network or amplifier 25 and thereafter to a limit circuit 26. The output of the limit circuit 26 is connected to summing circuit 24 where it is summed with vertical rate error signal $\dot{h}_{ERR}$ (hereinafter referred to as the damping signal) to produce an output signal proportional to the algebraic sum thereof. The vertical displacement signal $V_{ERR}$ is also coupled to an integrator circuit 27 where it is integrated and thereafter supplied to another summing circuit 28 where it is compared with the output of summing circuit 24. The output of summing circuit 28, the pitch command signal, may be coupled to an aircraft automatic flight control system 29 for maintaining the craft on the flight path.

The vertical displacement signal $V_{ERR}$ as earlier noted, is coupled to amplifier 25 which has a gain constant which may be varied with different phases of the vertical navigation mode. For example, as will be described below, the gain of amplifier 25 will be reduced for phases of the vertical navigation mode in which the discontinuities in the vertical displacement signal $V_{ERR}$ will be the most substantial such as passage of the craft over or near to the VOR/TAC station. The rate error gain of amplifier 23 may also be changed as will be described below. The output from amplifier 25 is coupled to a limiting circuit 26 which serves to limit the maximum amplitude of the vertical displacement signal $V_{ERR}$ thereby limiting the maximum correction maneuvering the craft can make regardless of the magnitude of $V_{ERR}$. The use of the limiting circuit 26 is primarily utilized during the time when the craft is close to or over the station.

The signal which leaves the limiting circuit 26 is combined with the vertical rate error damping signal $\dot{h}_{ERR}$ before being utilized by the craft automatic flight control system 29. The damping signal $\dot{h}_{ERR}$ is derived by subtracting a signal repesenting the actual vertical velocity of the craft $\dot{h}_{AC}$ from the reference vertical velocity signal $\dot{h}_{REF}$. This reference vertical velocity signal $\dot{h}_{REF}$ is a product of the true aircraft speed TAS and the angle of the flight path $V_{ANG}$ or $\gamma$ and represents the vertical velocity necessary to maintain the craft 11 on the flight path at a given speed. The resultant damping signal $\dot{h}_{ERR}$ is continuous and therefore useable throughout all phases of the vertical navigation mode. The integrator circuit 27 connected between the vertical displacement signal $V_{ERR}$ input and summing circuit 28 is a conventional, although optional, provision in control systems of this nature and is provided to eliminate long-term or fixed errors associated with the computation of the parameters.

The source of the flight path angle signal $V_{ANG}$ and the vertical displacement signal $V_{ERR}$ representing respectively the angle of the flight path and the craft displacement error therefrom is the VNAV computer 31 as has been noted. The true air speed TAS and the actual vertical velocity signal $\dot{h}_{AC}$ are normally available in an aircraft and typically are generated by a conventional air data computer such as computer 101 of FIG. 2.

Figure 3A:
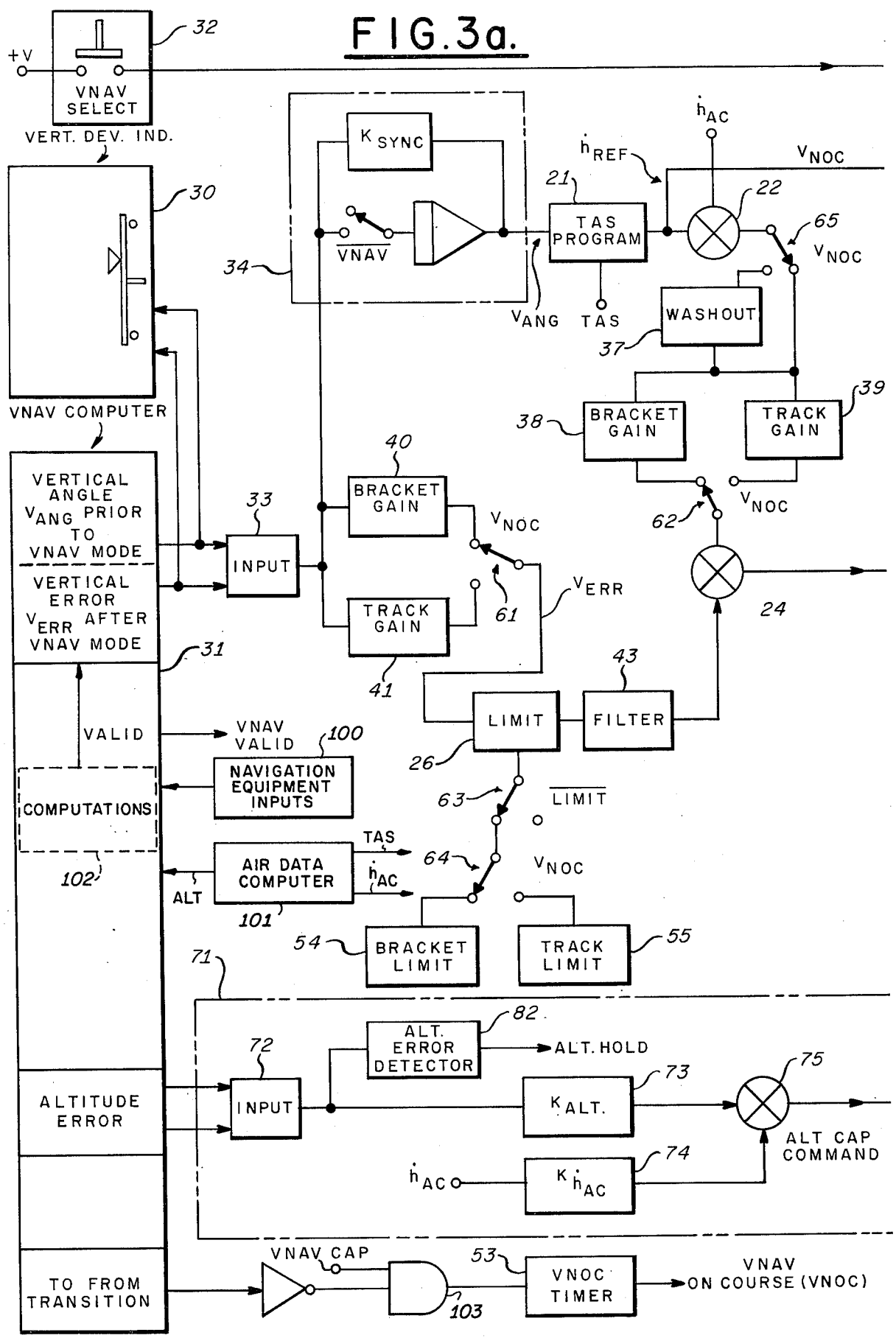
FIGS. 3A and 3B are a more detailed schematic-block diagram illustrating a preferred implementation of the present invention.
Figure 3B:
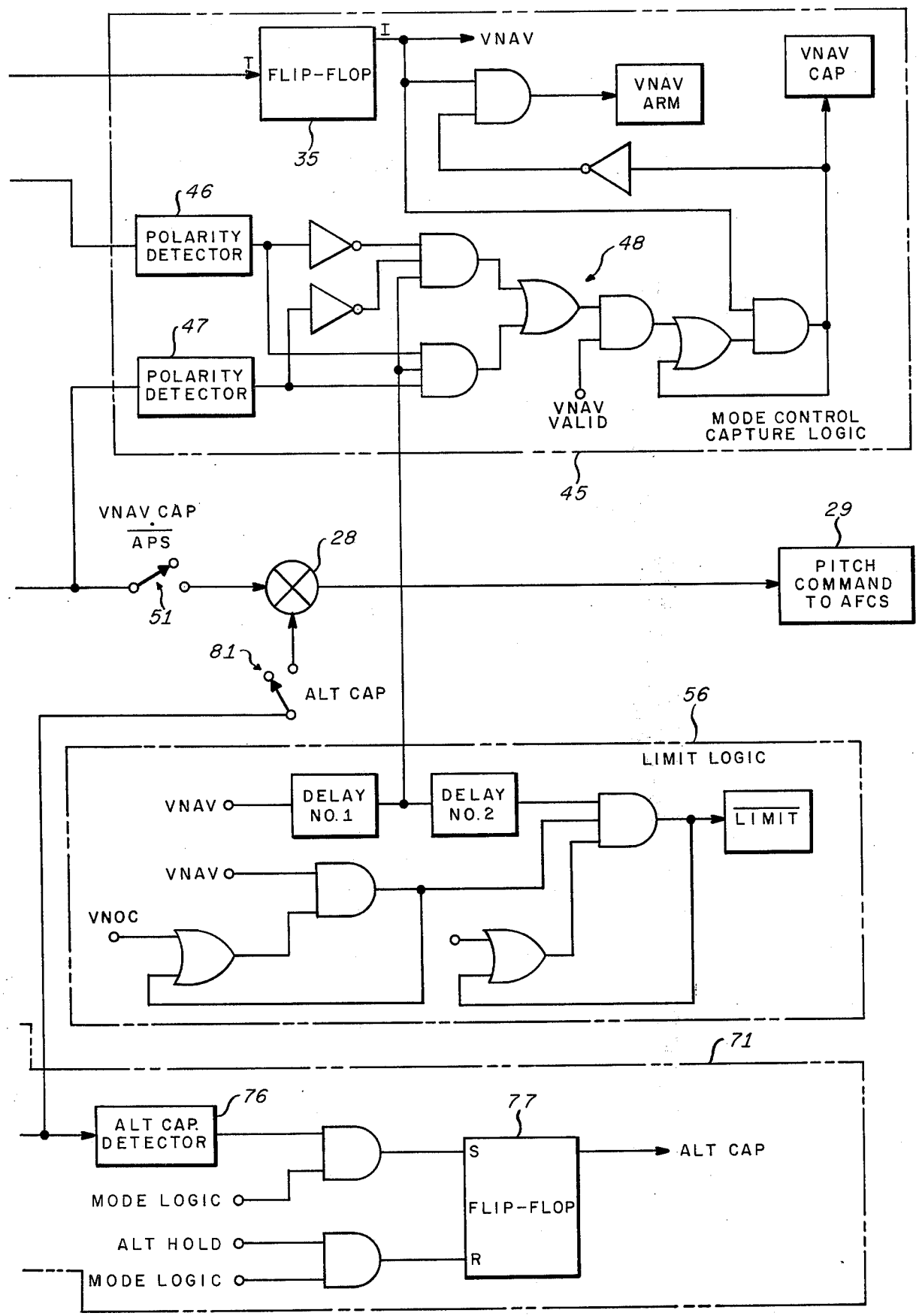

FIG. 3 schematically illustrates a preferable implementation of the vertical navigation system of the present invention. As previously mentioned, the angle of the flight path $\gamma$ may be either computed by the vertical navigation computer 31 or preselected manually by the pilot. In either event, the signal indicative of the angle $\gamma$ of the flight path and the vertical displacement error $V_{ERR}$ are preferably time-shared outputs from the vertical navigation computer 31. The vertical navigation computer 31 may be an analog or digital computer, preferably digital, which is arranged to solve equations (1), (2), (3), and (4), utilizing conventional airborne computer techniques well known to those skilled in airborne computer technology. Computations block 102 is a schematic representation of the conventional circuitry within the computer 31 for performing the computations in response to inputs from blocks 100 and 101 as indicated by the equations. The incorporation of time-sharing in a digital system eliminates the need for a second digital-to-analog converter.

Prior to activation of the vertical navigation system, i.e., by actuating the VNAV select switch 32, the $V_{ANG}$ signal is coupled to an input circuit 33. Once the craft is in the vertical navigation mode, the output signal flip-flop 35 changes state and conditions the sync/hold circuit 34 to memorize or store the $V_{ANG}$ signal. Simultaneously therewith, the $V_{ANG}$ signal is removed from input circuit 33 by the vertical navigation computer 31 and replaced by the vertical displacement error signal $V_{ERR}$. The vertical displacement error signal may also be coupled to the pilot's vertical deviation/indicator 30 permitting the pilot to monitor the autopilot system 29, or if he so desires, to manually control the craft.

The $V_{ANG}$ signal output of the sync/hold circuit 34 is coupled to the gain program circuit 21 where it is effectively multiplied by the TAS signal to produce the reference vertical velocity signal $h_{REF}$. This signal as previously described above is summed with the actual vertical velocity $h_{AC}$ signal in summing circuit 22. The output of summing circuit 22 is coupled to a washout circuit 37 which attenuates long-term or steady state errors associated with the $h_{REF}$ damping signal. In a typical example the wash out characteristic may be defined by the relation $$\frac{\tau s}{\tau s + 1}, \tau$$

is on the order of 40 and where s is the LaPlace operator. It will be noted that the wash out network 37 is used preferably, although not necessarily in the on-course mode only. The output of washout circuit 37 is coupled to gain networks 38 and 39 (represented as amplifier 23 in FIG. 2) and thereafter to summing circuit 24.

The vertical displacement error signal $V_{ERR}$ which is present at the output of input circuit 33 after activation of the vertical navigation system, is coupled to the gain networks 40 and 41 (shown as 25 in FIG. 2). The output of these networks is coupled to limit circuit 26 and thereafter is filtered by filter circuit 43 and coupled as a second input to summing circuit 24. Filter circuit 43 serves to smooth any transients in the $V_{ERR}$ signal due to limit changes, etc. Summing circuit 24 sums the damping signal $h_{ERR}$ and the vertical displacement error signal $V_{ERR}$ to produce the output pitch command signal $V_p$.

It should be noted that after activation of the vertical navigation system, the pitch command signal is not immediately applied to the vertical control of the craft 11 (i.e., the automatic flight control system (29)) in order to insure a smooth transition from the original flight path to the selected vertical flight path. The point (capture) at which control by the vertical navigation system begins, that is, the point at which a transition is made onto the vertical flight path, is determined by a capture logic circuit 45, which initiates the transition to the vertical NAV flight path. The capture circuitry 45 is comprised of a pair of polarity detectors 46 and 47 and a plurality of logic gates 48. The polarity detectors monitor the polarity of the pitch command signal $V_p$ and the polarity of the reference vertical velocity signal $h_{REF}$. When the logic circuitry 48 first detects a match between the polarity of these two signals, it actuates an electronic switch 51 by means of the capture logic signal $V_{CAP}$ output from the capture logic circuit 48, thereby coupling the pitch command signal $V_p$ to the automatic flight control system 29 through summing circuit 28.

It should be noted that the VNAV VALID signal, the MODE LOGIC signal, etc. are conventional logic sequence signals generated by the VNAV computer 31 which indicate proper functioning of the system.

As an example of the operation of the capture circuitry 45, consider the example for capturing a descending flight path where the pilot has selected the angle $\gamma$ of the flight path and craft is a considerable distance from intersection therewith. The polarity of the reference vertical velocity signal $V_{REF}$ for a descent is chosen for this example to be negative. While the craft 11 is vertically beneath the flight path 23, the polarity of the vertical displacement error signal $V_{ERR}$ will be opposite (positive) to that of the reference vertical velocity signal $V_{REF}$. Similarly, the polarity of the pitch command signal $V_p$ will also be positive which would result in the craft "flying up" if the pitch command signal $V_p$ were coupled to the automatic flight control system 29. As the craft approaches the vertical flight path, the magnitudes of the vertical displacement signal $V_{ERR}$ and the pitch command signal $V_p$ will approach a null. Similarly, the polarity of the pitch command signal $V_p$ will approach a transition point or a null point between the transition from positive polarity to negative polarity. A sufficient distance ahead of intersection of the craft 11 with the vertical flight path, the null point will be reached. This distance varies directly with the velocity of the craft and is automatically compensated for within the system. A null point is chosen ahead of the intersection with the vertical flight path to permit a smooth transition on to the vertical flight path. Furthermore, since capture occurs at the null point of the pitch command signal $V_p$, a smooth transition onto the flight path is insured since the initial input to the automatic flight control system 29 will be minimal in magnitude.

A timing circuit 53 hereinafter referred to as the vertical navigation on-course timer, is utilized to vary the gains of the vertical displacement signal $V_{ERR}$ and the damping signal $h_{ERR}$ by switching between amplifier 38 and 39 and between amplifiers 40 and 41, respectively. Similarly, the VNAV on-course timer, varies the limit permitted by the limit circuit 26 by switching between limit value circuits 54 and 55.

During specific phases of the vertical navigation mode, it is desirable to adjust the gains or vary the emphasis between the vertical displacement signal $V_{ERR}$ and the damping signal $h_{ERR}$. More particularly during phases commonly referred to as the bracket phase, (such as the period prior to capture or during passage of the craft 11 over or near the VOR/TAC station) in which the vertical displacement signal $V_{ERR}$ is likely to be large and/or substantially discontinuous, it is desirable to deemphasize $V_{ERR}$ by reducing the gain thereof and to emphasize $\dot{h}_{ERR}$ by increasing its gain. Conversely, after the craft is determined to be on-course, commonly referred to as the track phase, it is desirable to place the emphasis on the vertical displacement error signal $V_{ERR}$ and de-emphasize the damping signal $\dot{h}_{ERR}$. Accordingly, amplifiers 38 and 40 represent the bracket phase gains of the $V_{ERR}$ and $\dot{h}_{ERR}$ signals while amplifiers 39 and 41 represent the track phase gains thereof and a pair of electronic switches 61 and 62, actuated by the VNAV on-course timer 53, are utilized to switch therebetween.

The vertical navigation on-course timer 53 is designed to actuate electronic switches 61 and 62 after a period of time sufficient to permit the craft to orient itself or settle out on-course. After this period has elapsed, the vertical navigation on-course timer 53 will generate an output signal $V_{NOC}$ to actuate electronic switches 61 and 62. Actuation of electronic switches 61 and 62 result in a switch to the track phase gains (amplifiers 39 and 41). In order to revert to the bracket phase gain values (amplifiers 38 and 40) when the craft pases over or near to the VOR/TAC station, the vertical navigation computer 31 provides a TO/FROM signal for this purpose. Specifically, the magnitude of the TO/FROM signal goes to zero when the vertical navigation computer detects this, via AND gate 103, resets the VNAV on-course timer 53 which in turn actuates electronic switches 61 and 62. Therefore, the bracket gain (amplifiers 38 and 40) are once again in operation. However, after the time period of the vertical navigation on-course timer 53 has elapsed, electronic switches 61 and 62 are re-actuated re-establishing the track phase gains for the $V_{ERR}$ and $\dot{h}_{ERR}$ signal at which time the craft will be past the discontinuity area of the VOR/TAC station.

The apparatus for varying the limit value of limit circuit 26 is somewhat different from that for gain circuits. Specifically, the different limit values 54 and 55 of limit circuit 26 are not initially utilized. When the vertical navigation system is initially activated, electronic switch 63 prevents coupling between the limit circuit 26 and the two limit values 54 and 55. The electronic delay switch 65 is actuated by the limit logic 56 which incorporates a conventional pedetermined time delay after capture occurs, into the actuation of switch 65 to insure that system is functioning properly. Typically, this time delay will exceed the time period of the VANV on-course timer 53. Therefore, when the electronic switch 63 is actuated, the track phase limit circuit 55 will be coupled to the limit circuit 26 since an electronic switch 64 similar to switches 61 and 62 will have been actuated by the VNAV on-course timer 53. Thereafter, when the craft passes over or near the VOR/TAC station, electronic switch 64 will be re-activated and the bracket phase limit circuit 54 will be coupled to the limit circuit 26. This will reduce the maximum value of the vertical displacement error signal $V_{ERR}$ permitted by the limit circuit 26 at this time when maximum discontinuity in the vertical displacement signal may be expected. Once the time period of VNAV on-course timer has elapsed, electronic switch 64 will reconnect track phase limit circuit 55 to the limit circuit 26.

The output $V_{NOC}$ of the VNAV on-course timer 53 may also actuate the washout circuit 37, as shown in FIG. 3 by means of switch 65. Therefore, each time the timer 53 is reactuated, the washout circuit 37 will commence operation after the time period of the timer 53 has elapsed.

The remaining apparatus of the vertical navigation system to be discussed is transition circuit 71 which is incorporated to effect a smooth transition from the vertical flight path onto the new flight path at the desired altitude $h_S$. The vertical navigation computer 31 calculates an altitude error signal in conventional fashion which represents the difference between the altitude of the craft and the desired altitude $h_S$. The altitude error signal is coupled to an input circuit 72 and thereafter to an altitude error gain circuit 73. The actual vertical velocity signal, $\dot{h}_{AC}$, derived from the air data computer, is also coupled to amplifier 74. The outputs from amplifiers 73 and 74 are connected to a summing circuit 75 to produce an altitude capture command signal $V_{ALT}$. An altitude capture detector circuit 76 is incorporated to detect the null of the altitude capture command signal $V_{ALT}$. The altitude capture detector 76, upon detecting the null output from summing circuit 75, will actuate the altitude capture flip-flop 77 into the set mode. In the set mode, the altitude capture flip-flop 77 generates an output signal $V_{ALT\ CAP}$ to close electronic switch 81 and open switch 51. At this point, the altitude capture command signal $V_{ALT}$ is directing the vertical flight of the craft 11 (via the automatic flight control system 29) resulting in an asymptotic levelling off of the craft 11 at the desired altitude $h_S$. It should be noted that once again a smooth transition is insured since the magnitude of the altitude capture command signal $V_{ALT}$ will be at its null magnitude when first applied to the automatic flight control system 28.

The vertical navigation control system and in particular amplifiers 73 and 74 are adjusted to compensate the null point of summing circuit 75 with respect to the actual vertical velocity $\dot{h}_{AC}$ of the craft. Specifically, the gains of amplifiers 73 and 74 are adjusted so that the altitude at which the null point in the altitude capture command signal $V_{ALT}$ occurs depends on the actual vertical velocity $\dot{h}_{AC}$ of the craft. Specifically, the difference between the altitude at which the null in the altitude capture signal $V_{ALT}$ occurs and the desired altitude $h_S$ will increase directly with the magnitude of the actual vertical velocity $\dot{h}_{AC}$. This is obviously necessary to insure a smooth transition from the vertical flight path onto the new flight path.

The output from input circuit 72 is also coupled to an altitude error detector 82. The altitude error detector produces an altitude hold signal when the difference between the altitude error and the desired altitude $h_S$ is detected to be less than a preselected value, typically 40 feet. The altitude hold signal thereafter resets the altitude capture flip-flop 77 which in turn actuates switch 81, disconnecting the altitude capture signal $V_{ALT}$ from the automatic flight control system 44. The altitude hold signal is then normally coupled to an automatic hold circuit in the automatic flight control system which maintains the craft at the desired altitude $h_S$ thereby completing the operation of the vertical navigation system.

While the invention has been described in its preferred embodiment, i.e., as applied to an automatic pilot for an aircraft, it is to be understood that the invention in its broadest aspects is not so limited in application. It will be evident to those skilled in this art that the output of the apparatus of the present invention may be applied to a flight director indicator by means of which the pilot in following the dictates thereof, may control the aircraft manually to follow the prescribed flight path. Also, it will be understood that the aircraft may be a VTOL type aircraft, such as a helicopter and thus dependent upon this mode of operation thereof, the output of the apparatus may be applied to the cyclic rotor pitch and/or collective rotor pitch control apparatus or the corresponding command cues of a helicopter flight director. Finally, it will be understood that the words which have been used are words of description rather than limitation, and that changes within the purview of the appended claims may be made without departing from the true scope and spirit of the invention in its broader aspects.

We claim:

1. Vertical navigation control apparatus for controlling an aircraft to maintain a predetermined vertical flight path angle from an existing barometric altitude to a desired barometric altitude, said desired barometric altitude being at a predetermined navigation waypoint horizontally offset from a reference VOR/TAC station transmitter, and having receiver apparatus for providing in response to transmissions from sid VOR/TAC station a DME signal indicative of the straight-line distance between the craft and said station and a TO/FROM signal indicating the presence of the craft in the vertical vicinity over said VOR/TAC station, air data apparatus for providing signals indicative of said existing aircraft barometric altitude and the rate of change of aircraft barometric altitude and means for providing a signal in accordance with said desired barometric altitude and the horizontal offset distance between said waypoint and said VOR/TAC station, said vertical navigation control apparatus comprising:

Computer means responsive to said DME signal, said horizontal offset distance signal, said existing aircraft barometric altitude signal and said desired barometric altitude signal for computing a flight path angle error signal indicative of the vertical displacement of the craft from said vertical flight path angle and wherein said flight path angle error signal is subject to transient errors therein in the vicinity of said VOR/TAC station resulting from any difference between the barometric altitude of the craft and said DME signal, means responsive to said rate of change of aircraft barometric altitude signal for providing a system damping signal representing the vertical rate error of the aircraft from the vertical rate required to maintain said vertical flight path angle, means responsive to said flight path angle error signal and said damping signal for supplying a craft control signal from the algebraic sum thereof, and means independent of said damping signal and responsive to said TO/FROM signal for limiting said flight path angle error signal to a predetermined maximum amplitude when the aircraft is in the vicinity of said VOR/TAC station thereby reducing the response of the craft to said transient errors therein.

2. The apparatus as set forth in claim 1 wherein said air data apparatus further provides a signal indicative of the true airspeed of the craft and wherein said means for providing a damping signal comprises:

means for producing a flight path angle signal representative of the angle of said predetermined vertical flight path angle, means for combining said flight path angle signal and said true airspeed signal for producing from the product thereof a reference vertical velocity signal representative of said vertical rate required to maintain the aircraft on said flight path angle, means for differentially summing said reference vertical velocity signal and said rate of change of barometric altitude signal and producing said damping signal from the difference therebetween.

3. The apparatus as set forth in claim 2 wherein said limiting mens comprises a variable limiter means responsive to said TO/FROM signal for limiting the maximum amplitude of said flight path angle error signal to a first amplitude for a first value of said TO/FROM signal indicative that the craft is approaching said VOR/TAC station and for limiting the maximum amplitude of said flight path angle error signal to a second amplitude for a second value of said TO/FROM signal indicative that the craft is in the vicinity of said VOR/TAC station.

4. The apparatus as set forth in claim 3 further including first variable gain means for adjusting the amplitude of said flight path angle error signal and means responsive to said TO/FROM signal for controlling said first variable gain means.

5. The apparatus as set forth in claim 4 further including second variable gain means for adjusting the amplitude of said damping signal and means responsive to said TO/FROM signal for controlling said second variable gain means.

6. the apparatus as set forth in claim 1 further including, first and second variable gain means responsive to said flight path angle error signal and said damping signal respectively for providing a first predetermined ratio of signal gains required to control the aircraft to bracket said vertical flight path angle and for providing a second predetermined ratio of signal gains required to control the aircraft to track said vertical flight path angle, means for providing a vertical rate reference signal in accordance with the craft vertical rate required to maintain said vertical flight path angle, first logic means responsive to said flight path angle error signal and said vertical rate reference signal for actuating said first and second variable gain means to provide said first predetermined ratio of signal gains, and second logic means including timing means responsive to said first logic means and to a first value of said TO/FROM signal for actuating said first and second variable gain means to provide said second predetermined ratio of signal gains after a fixed time period subsequent to the activation of said first logic means, said second logic means being responsive to a second value of said TO/FROM signal for resetting said timing means and re-establishing said first predetermined ratio of signal gains.

7. The apparatus as set forth in claim 6 further including means responsive to the operation of said second logic means for actuating said limiting means.

* * * * *